(12) United States Patent
Singh et al.

(10) Patent No.: US 7,797,400 B2
(45) Date of Patent: Sep. 14, 2010

(54) COMPUTER-IMPLEMENTED METHODS AND SYSTEMS FOR TESTING THE INTEROPERABILITY OF WEB SERVICES

(75) Inventors: Vebhhav Singh, Sunnyvale, CA (US); Nan Xie, Fremont, CA (US); James Dang, Belmont, CA (US); Anping Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 423 days.

(21) Appl. No.: 11/470,613

(22) Filed: Sep. 6, 2006

(65) Prior Publication Data
US 2008/0059558 A1 Mar. 6, 2008

(51) Int. Cl.
G06F 15/16 (2006.01)
G06F 15/173 (2006.01)
G06F 17/00 (2006.01)
G06F 17/20 (2006.01)
G01M 19/00 (2006.01)

(52) U.S. Cl. .................. 709/219; 702/124; 709/224; 715/234

(58) Field of Classification Search .......... 709/217, 709/219, 224; 702/124; 715/234
See application file for complete search history.

(56) References Cited

U.S. PATENT DOCUMENTS

| 6,889,160 B2* | 5/2005 | Sabiers et al. ............. 702/122 |
| 6,920,410 B2* | 7/2005 | Southam et al. ........... 702/122 |
| 7,028,223 B1* | 4/2006 | Kolawa et al. ............. 714/38 |
| 7,421,679 B2* | 9/2008 | Hansen et al. ............. 717/124 |
| 2003/0074423 A1* | 4/2003 | Mayberry et al. .......... 709/219 |
| 2003/0188039 A1* | 10/2003 | Liu et al. .................. 709/315 |
| 2004/0064528 A1* | 4/2004 | Meredith et al. .......... 709/219 |
| 2004/0068586 A1 | 4/2004 | Xie et al. |
| 2004/0199818 A1* | 10/2004 | Boilen et al. .............. 714/25 |
| 2005/0251527 A1 | 11/2005 | Phillips et al. |
| 2006/0265475 A9* | 11/2006 | Mayberry et al. .......... 709/219 |

OTHER PUBLICATIONS

Andrews, Tony et al. "Business Process Execution Language for Web Services", version 1.1, May 5, 2003, 136 pages.*
Axis User's Guide 1.2 Version, http://ws.apache.org/axis/java/user-guide.html, 2006 (30pgs).

(Continued)

Primary Examiner—George C Neurauter, Jr.
(74) Attorney, Agent, or Firm—Townsend and Townsend and Crew LLP (57) ABSTRACT

A computer-implemented method of testing interoperability of a web service against a plurality of web services tools may include steps of providing a web services description language file (WSDL) that describes the web service to be tested; selecting at least one of the plurality of web services tools; generating and compiling sets of proxy files for each selected web service tool based upon the provided WSDL file and loading the generated and compiled proxy files into memory; generating an XML test case for each of the generated and compiled sets of proxy files, the XML test case including dummy variables for each operation of the provided WSDL file; populating the generated XML test case with values for at least some of the dummy variables, and invoking a targeted web service from a selected client platform using the populated XML test case and providing results for each invocation.

36 Claims, 8 Drawing Sheets

OTHER PUBLICATIONS

Antonia Bertolino and Andrea Polini, "The Audition Framework for Testing Web Services Interoperability" (9pgs).

Microsoft Corporation, "Understanding Distributed Technologies", http://msdn/microsoft.com/webservices/understanding/default.aspx, 2006 (4pgs).

W.T. Tsai, Ray Paul, Weiwei Song, Zhibin Cao, The Computer Society, 7th IEEE International Symposium on High Assurance Systems Engineering (HASE'02) 1530-2059/02, "Coyote: An XML-Based Framework for Web Services Testing" (2pgs).

Microsoft Corporation, "Building Interoperable Web Services: WS-I Basic Profile 1.0" http://msdn.microsoft.com/webservices/webservices/building/interop/default.aspx?pull=/li, 2006 (3pgs).

Wikipedia, "Web Service", http://en.wikipedia.org/wiki/Web_Services, printed Jan. 4, 2006 (4pgs).

Microsoft Corporation, Roger Wolter "XML Web Services Basics", http://msdn.microsoft.com/webservices/webservices/understanding/webservicebasics/defaul..., Dec. 2001 (5pgs).

* cited by examiner

FIG. 2

![Figure 3: Screenshot of a browser window showing a web interface with URL field "http://api.guule.com/GuuleSearch.wsdl" (302), checkboxes for "Compile Axis" (304), "Compile Bpel" (306), "Compile DotNet" (308), buttons "Generate New TestCase" (310), "Remove WSDL" (312), "SUBMIT", "ADD WSDL", field "Add New WSDL:", link "WS Security Settings", top buttons "TestGroup Name", "Run Axis", "RunBpel", "Run DotNet", footer "Copyright 2006 XYZ CO" and links "Home Logout Help"]

Operation: name = doGetCachedPage
TargetNameSpace = urn:GuuleSearch
Service = GuuleSearchService inputMessage
Part name = key
Namespace = hhttp://www.w3.org/2001/XMLSchema
Type = string    234nsemacsLKmsdCq230   —502

Part name = q
Namespace = http://www.w3.org/XMLSchema
Type = string    kannan   —504

Part name = start
Namespace = http://www.w3.org/XMLSchema
Type = int    1   —506

Part name = maxResults
Namespace = http://www.w3.org/XMLSchema
Type = int    10   —508

Part name = filter
Namespace = http://www.w3.org/XMLSchema
Type = boolean    false   —510

Part name = restrict
Namespace = http://www.w3.org/XMLSchema
Type = boolean    false   —512

Home  Logout  Help

COMPUTER-IMPLEMENTED METHODS AND SYSTEMS FOR TESTING THE INTEROPERABILITY OF WEB SERVICES

BACKGROUND OF THE INVENTION

1. Field of the Invention

The present invention relates to web services. More particularly, the present invention relates to testing the interoperability of web services across a plurality of web service tools.

2. Description of the Prior Art and Related Information

Services provided over the Internet, commonly referred to as web services or application services, are evolving. Likewise, technologies that facilitate such services are also evolving. A web service may be defined as any information source running business logic processes that is configured for remote use by an application or end-user. Web services provide interoperability between various software applications running on disparate platforms, as they are, for the most part, based upon open standards and protocols. Protocols and data formats are text-based where possible, making it easy for developers to comprehend, making web services the preferred means through which functionality is exposed and accessed over computer networks such as the Internet. Web services typically include some combination of programming and data that are made available from an application server for end users and other network-connected application programs. Web services range from such services as storage management and customer relationship management down to much more limited services and functionality such as the creation of purchase orders.

Web services are commonly described in a machine-processable and structured definition language known as web Services Description Language (WSDL). WSDL, commonly pronounced "wiz-dull", is an eXtensible Markup Language (XML) format published for describing web services. WSDL describes the public interface to the web service. It is an XML-based service description on how to communicate using the web service; namely, the protocol bindings and message formats required to interact with the web services listed in its directory. The supported operations carried out by the web service and messages are described abstractly, and then bound to a concrete network protocol and message format.

WSDL is often used in combination with SOAP and XML to provide web services over the Internet. SOAP is a protocol for exchanging XML-based messages conveyed over a computer network, normally using Hyper Text Transfer Protocol (HTTP). By utilizing HTTP, web services can work through many common firewall security measures without requiring changes to the firewall filtering rules. SOAP forms the foundation layer of the web services stack, providing a basic messaging framework that more abstract layers can build on. A client program connecting to a web service can read the WSDL to determine what functions are available on the server. Any special data types used are embedded or imported in the WSDL file in the form of XML Schema. The client can then use SOAP to call one of the operations listed in the WSDL.

W3C is the primary committees responsible for the architecture and standardization of web services. To improve interoperability between web service implementations, the WS-I organization has been developing further constraints on WSDL to promote interoperability. WS-I is an open, industry group that was formed in 2002 to promote web services interoperability across platforms, operating systems, and programming languages.

Currently, the web service usage model is generally as follows. Services are implemented and deployed on one site, often referred to as the server side. Services are described using WSDL and are published via means such as UDDI (Universal Description, Discovery, and Integration), which is an XML-based registry for businesses worldwide to list themselves on the Internet by the web services they offer and which enables applications to look up web services information in order to determine whether to use them. Client applications use web services at another site, often referred to as the client side, by first interpreting one or more WSDL documents. Once interpreted, the clients can understand the characteristics of the associated service(s). For example, service characteristics may include service API specifications such as (a) input data type, (b) service input data format, (c) service access mechanism or style (e.g., remote procedure call—RPC—versus messaging), and (d) related encoding format. Client applications prepare their data in manners in which various particular web services understand. Client applications invoke a particular service according to the manner specified for the service, such as in an associated WSDL document.

Many differences exist among web services with respect to the format of input data and the manner in which they are invoked. For example, an application service provider may provide a service "NewPurchaseOrder" that requires a number of input parameters including, for example, a vendor ID and an amount for purchase order. A client application that intends to invoke such a service must be written so that data within or output by the application is able to be analyzed to generate the purchase order. At runtime, the prepared provided input data is passed to the "NewPurchaseOrder" service site using appropriate Application Program Interfaces (APIs). Data types represent a common interoperability problem. SOAP uses serializer and deserializer objects to translate from the native language of a software application to the SOAP protocols that move the request over the wire. It is here where native languages introduce dependencies on the data. For example, the way Java defines date or floating point objects (which may be present in the web service, such as the "NewPurchaseOrder" example developed herein) may be different from the manner in which Microsoft's .NET formats such date and floating point objects. In this manner, SOAP data types with the same name may be formatted differently, causing interoperability issues among the different web services tools. Therefore, in order to test a web service against different web service clients, it is conventionally necessary to write hard coded programs called test cases that are specific to every web service client and every web service. Web services test cases written once cannot typically be applied to every other kind of web service client. Due to the complexity of the various standards involved, however, web service authoring tools are not typically successful in completely conforming to these standards. In the final analysis, however, the aim of testing the interoperability (as opposed to the underlying functionality thereof) of web services is not to test how well a given web service conforms to the WS-I-promulgated standards, but to test the interoperability of the web service against all types of web service clients.

From the foregoing, it may be appreciated that improved methods and systems for testing the interoperability of web services against all types of web clients are needed. What are also needed are computer-implemented methods and systems for testing web services defined by WDSL files against all commonly used web services tools.

SUMMARY OF THE INVENTION

According to an embodiment thereof, the present invention is a computer-implemented method of testing interoperability of a web service against a plurality of web services tools. Such a computer-implemented method may include steps of providing a web services description language file (WSDL) that describes the web service to be tested; selecting at least one of the plurality of web services tools; generating and compiling sets of proxy files for each selected web service tool based upon the provided WSDL file and loading the generated and compiled proxy files into memory; generating an XML test case for each of the generated and compiled sets of proxy files, the XML test case including dummy variables for each operation of the provided WSDL file; populating the generated XML test case with values for at least some of the dummy variables of the generated XML test case, and invoking a targeted web service from a selected client platform using the populated XML test case and providing results for each invocation.

According to further embodiments, the selecting step may be carried out with the plurality of web services tools including AXIS, .NET and BPEL, for example. The WSDL providing step may include a step of providing a location of the WSDL file. The location may include the URL of the WSDL file. The generating and compiling step may be carried out in a platform specific manner. For example, the generating and compiling step may be carried out with the sets of proxy files including Java proxy files and class files when the selected web services tool is AXIS, stubs in C# and .DLL files when the selected web services tool is .NET, and BPEL XML files and reference WSDL files when the selected web services tool is BPEL. The populating step may be carried out through a user-interface configured to allow a user to input values for each of the dummy variables for each operation of the generated XML test case. The invoking step may be carried out with the results in XML format. The method may further include a step of displaying the results as an HTML file using, for example, a stylesheet. The generating step may be carried out with the XML test case including an assertion. The included assertion may include dummy variables enabling, for example, the name of the assertion, an expression to be evaluated in the response to the assertion, an expected value of the assertion and/or an error message of the assertion to be provided. The generating step may be carried out with the XML test case including an attachment. The attachment may be specified as, for example, Multipurpose Internet Mail Extension (Mime) data (for example) and may include dummy variables enabling the type of the attachment and the location of the attachment to be provided. The method may further include a step of providing an HTML front end to enable user input in some or all of the providing, selecting, generating, populating and invoking steps.

According to another embodiment thereof, the present invention is a machine-readable medium having data stored thereon representing sequences of instructions which, when executed by a computing device, causes the computing device to enable testing interoperability of a web service against a plurality of web services tools, by performing steps of providing a web services description language file (WSDL) that describes the web service to be tested; selecting at least one of the plurality of web services tools; generating and compiling sets of proxy files for each selected web service tool based upon the provided WSDL file and loading the generated and compiled proxy files into memory; generating an XML test case for each of the generated and compiled sets of proxy files, the XML test case including dummy variables for each operation of the provided WSDL file; populating the generated XML test case with values for at least some of the dummy variables, and invoking a targeted web service from a selected client platform using the populated XML test case and providing results for each invoked invocation.

The selecting step may be carried out with the plurality of web services tools including, for example, AXIS, .NET and BPEL. The WSDL providing step may include a step of providing the location of the WSDL file. The location may include the URL of the WSDL file. The generating and compiling step may be carried out in a platform-specific manner. The generating and compiling step may be carried out, for example, with the sets of proxy files including Java proxy files and class files when the selected web services tool is AXIS, stubs in C# and .DLL files when the selected web services tool is .NET, and BPEL XML files and reference WSDL files when the selected web services tool is BPEL. The populating step may be carried out through a user-interface configured to allow a user to input values for each of the dummy variables for each operation of the generated XML test case. The invoking step may be carried out with the results in XML format. A step of displaying the results as an HTML file using a stylesheet (for example) may be carried out. The generating step may be carried out with the XML test case including an assertion and the assertion may include dummy variables enabling, for example, the name of the assertion, an expression to be searched in the response to the assertion, an expected value of the assertion and/or an error message of the assertion to be provided. The generating step may be carried out with the XML test case including an attachment. The attachment may be specified as Multipurpose Internet Mail Extension (Mime) data (for example) and may include dummy variables enabling the type of the attachment and the location of the attachment to be provided. A step may be carried out of providing an HTML front end to enable user input in at least some of the providing, selecting, generating, populating and invoking steps.

According to still another embodiment, the present invention is a computer system for enabling testing interoperability of a web service against a plurality of web services tools. Such a computer system may include at least one processor; at least one data storage device coupled to the at least one processor; and a plurality of processes spawned by the at least one processor. The processes may include processing logic for providing a web services description language file (WSDL) that describes the web service to be tested; selecting at least one of the plurality of web services tools; generating and compiling sets of proxy files for each selected web service tool based upon the provided WSDL file and loading the generated and compiled proxy files into memory; generating an XML test case for each of the generated and compiled sets of proxy files, the XML test case including dummy variables for each operation of the provided WSDL file; populating the generated XML test case with values for at least some of the dummy variables of the generated XML test case, and invoking a targeted web service from a selected client platform using the populated XML test case and providing results for each invocation.

The selecting step may be carried out with the plurality of web services tools including AXIS, .NET and BPEL, for example. The WSDL providing step may include a step of providing the location of the WSDL file. The location may include the URL of the WSDL file. The generating and compiling step may be carried out in a platform-specific manner.

For example, the generating and compiling step may be carried out with the sets of proxy files including Java proxy files and class files when the selected web services tool is AXIS, stubs in C# and .DLL files when the selected web services tool is .NET, and BPEL XML files and reference WSDL files when the selected web services tool is BPEL. The populating step may be carried out through a user-interface configured to allow a user to input values for each of the dummy variables for each operation of the generated XML test case. The invoking step may be carried out with the results in XML format. A step of displaying the results as an HTML file using a stylesheet (for example) may also be carried out. The generating step may be carried out with the XML test case including an assertion and the assertion may include dummy variables enabling, for example, the name of the assertion, an expression to be searched in the response to the assertion, an expected value of the assertion and/or an error message of the assertion to be provided. The generating step may be carried out with the XML test case including an attachment. The attachment may be specified as Multipurpose Internet Mail Extension (Mime) data (for example) and may include dummy variables enabling the type of the attachment and the location of the attachment to be provided. A step of providing an HTML front end to enable user input in the providing, selecting, generating, populating and/or invoking steps.

DETAILED DESCRIPTION

It is important that the web services that are exposed to computer networks are interoperable with the various clients that may access and invoke them. Embodiments of the present invention provide a framework that may be used to test the interoperability of such web services against various web service clients. Indeed, embodiments of the present invention enable web services developers to dynamically test a proposed web service described by a WSDL file for interoperability against any number of available web service tools. Currently, the most common web services tools are Axis, .NET and BPEL. Axis (Apache EXtensible Interaction System) is an open source, Java and XML based web service framework consisting of an implementation of the SOAP server, and various utilities and APIs for generating and deploying web service applications. .NET, in terms of web service testing, is a WSDL verification tool that accepts as input a URL that points to a WSDL file and that uses the Microsoft .NET framework to verify that the WSDL file pointed to by the URL is valid. Lastly, the Business Process Execution Language for web services (BPEL or BPEL4WS) framework is a language used for the definition, testing and execution of business processes using web services. BPEL enables the top-down realization of Service Oriented Architecture (SOA) through composition, orchestration, and coordination of web services. BPEL provides a relatively easy and straightforward way to compose several web services into new composite services called business processes. Although embodiments of the present invention are described herein relative to AXIS, .NET and BPEL, the present inventions are not limited to such web services tools and may be readily extended to other such web services tools.

Figure 1:
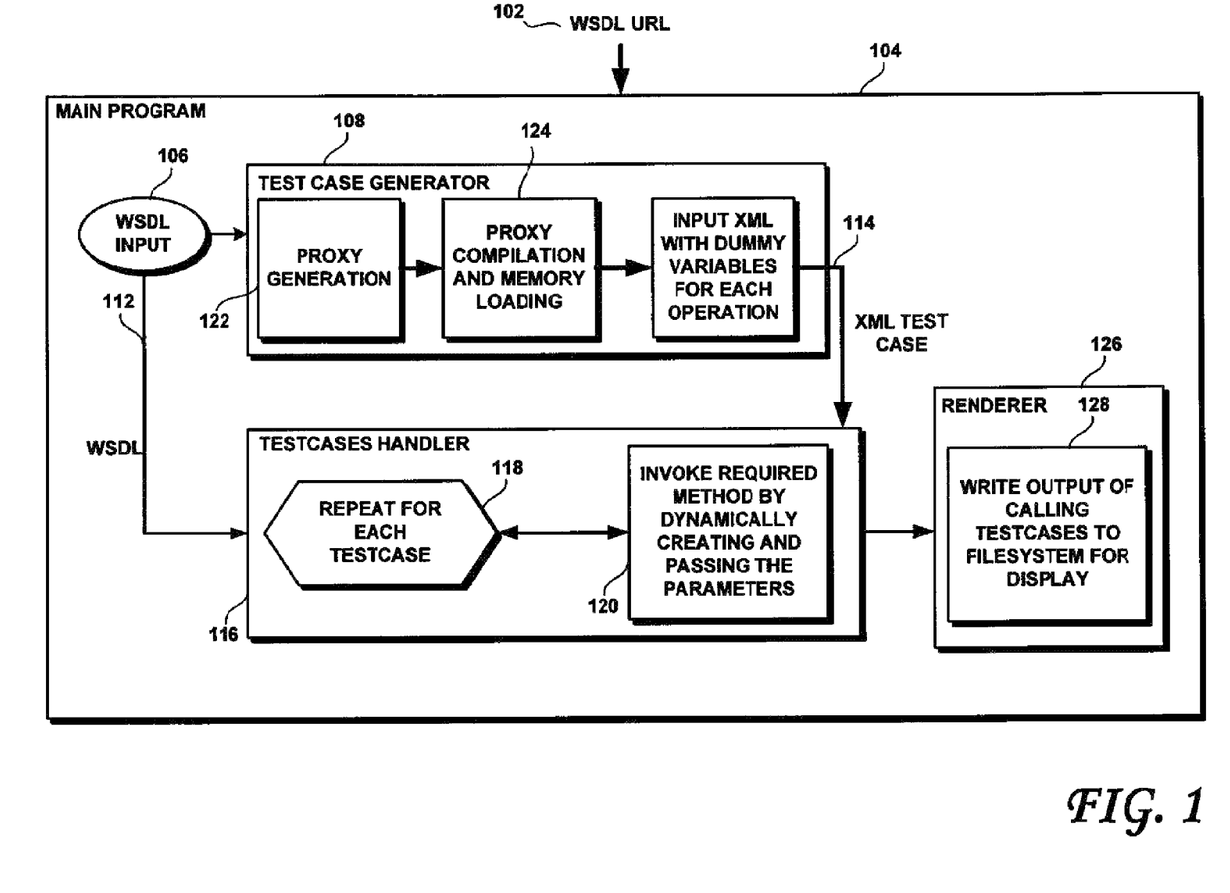
FIG. 1 is a block diagram that illustrates aspects of the present methods and systems for testing the interoperability of web services, according to embodiments of the present invention.
Figure 2:
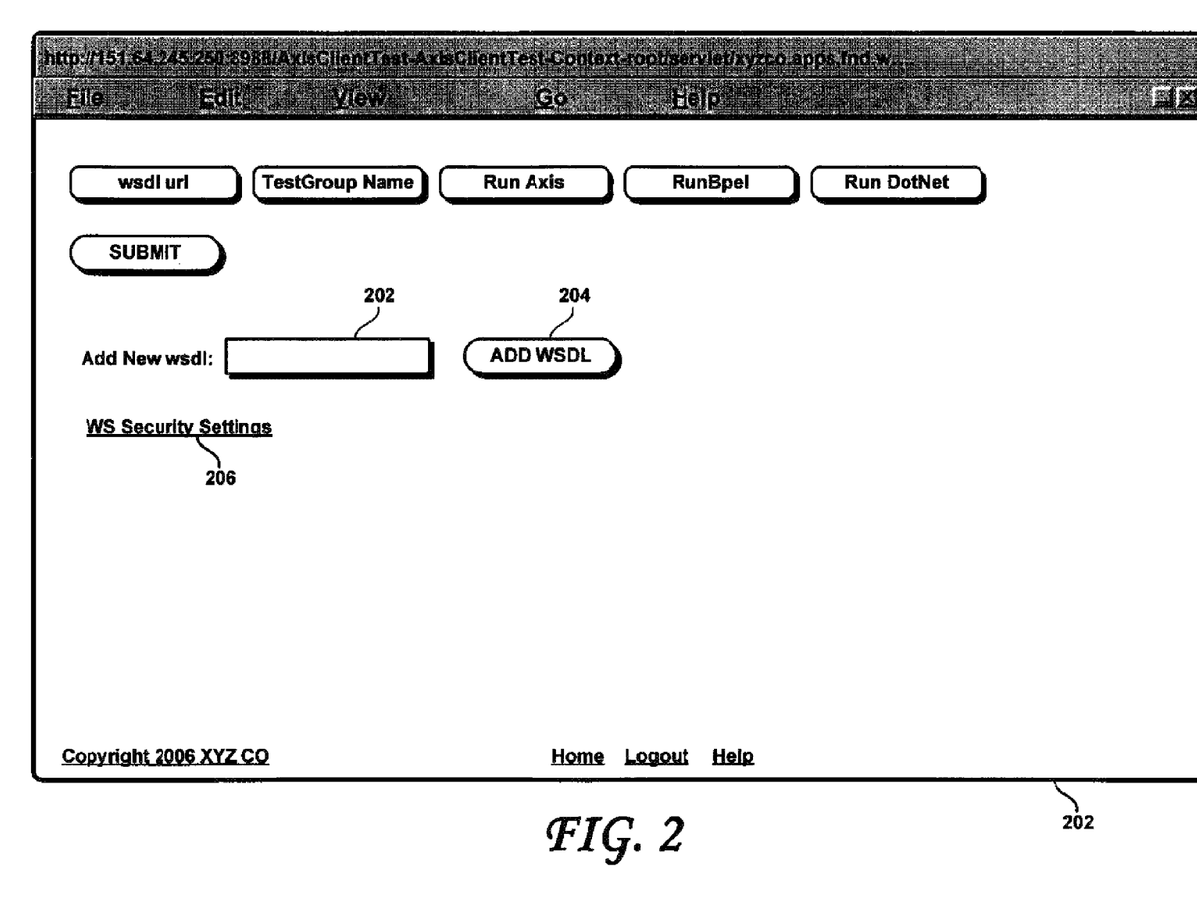
FIG. 2 shows further aspects and functionality of the present methods and systems for testing the interoperability of web services, according to embodiments of the present invention.
Figure 3:
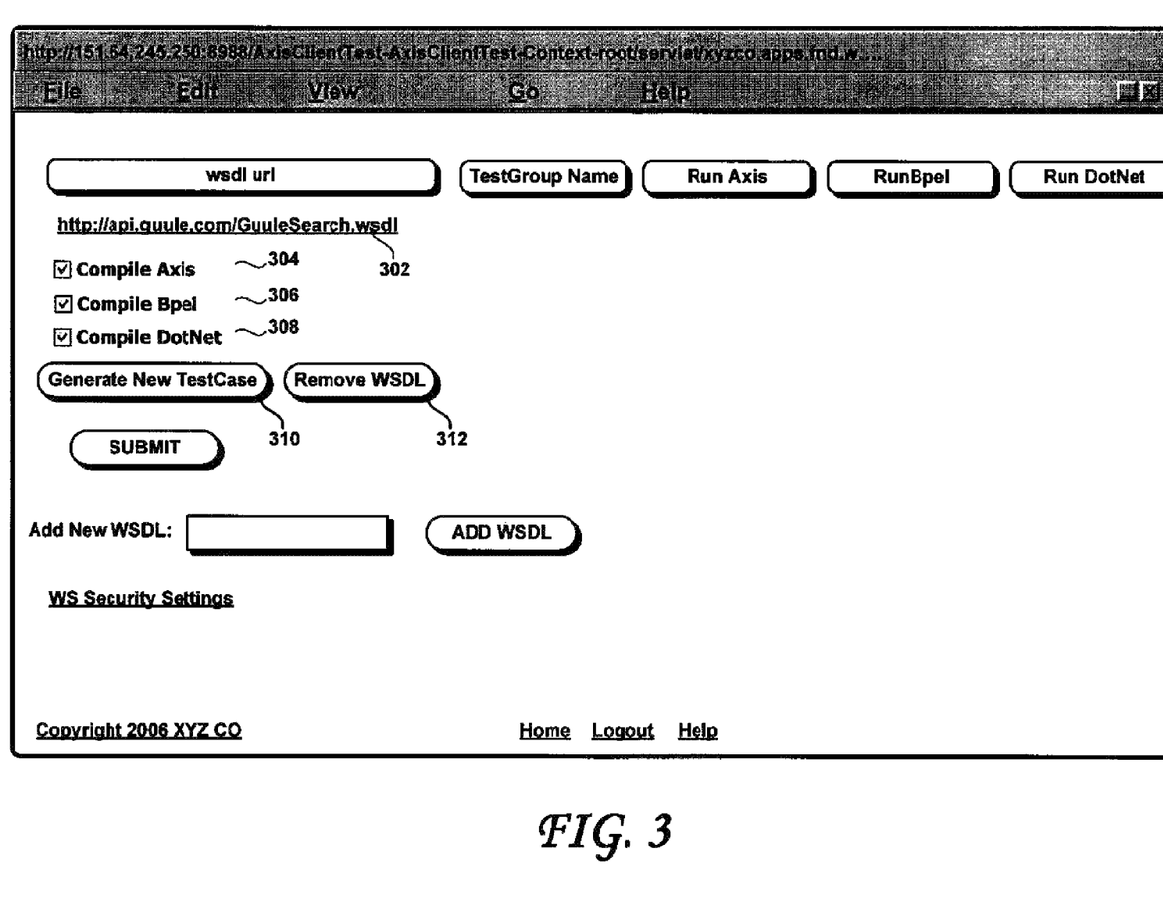
FIG. 3 shows further aspects of the present methods and systems for testing the interoperability of web services, according to embodiments of the present invention.

FIG. 1 is a block diagram illustrating aspects of an embodiment of the present invention for dynamically testing web services against a plurality of web service tools (clients). As shown therein, a Universal resource Locator (URL) of a WSDL file 102 describing the web service under test may be input (as shown in FIG. 2, for example) to the main program 104 that embodies the functionality of embodiments of the present invention. The WSDL file 106, fetched from the URL specified at 102, may then be input to a test case generator 108. The test case generator 108, according to an embodiment of the present invention, may include a proxy generation module 122. The proxy generation module 122 may, through an HTML front end (as shown in FIG. 3, for example) allow the user to specify which of the available web services tool or tools (e.g., AXIS, BPEL, and/or .NET) is/are to be uses in generating the test case(s). For example, the user may select one or all three of the currently available web services tools. For each web services tool selected by the user, a corresponding set of proxy files may be generated, based upon the WSDL file input to the test case generator 104. In the case in which an Axis client is selected, the generated set of proxy files may include JAVA proxy files which may then be compiled—as shown at 124—into JAVA classfiles. Proxies are sets of java classes created according to the definition defined in the WSDL. All the operations are available as java methods in the proxies. In the case in which the user selected BPEL as the web services tool against which to test the web service described by the WSDL file 106, the proxy generation module 122 may return a BPEL XML file and reference WSDLs, which are automatically compiled at the time of deployment. When the test case is to be generated using the .NET web service tool, the test case generation module 122 may return stubs in C#, which are then compiled at 124 to generate .DLL file(s).

The generated proxies (set of proxy files) corresponding to the selected web service tools (e.g., AXIS, .NET or BPEL, for example) may then be compiled and loaded into memory by the proxy compilation and memory loading module 124. For example, for the AXIS client, a JAVA reflection may be used to reflect the compiled classes and load them into memory. For AXIS clients, only the required methods may be reflected, depending upon the test case. The reflection represents, or reflects, the classes, interfaces, and objects in the current Java Virtual Machine. For BPEL clients, a bpelc command may be used to compile the BPEL xml file along with the reference WSDL files, and deploy it to the BPEL Process Manager (PM). For .NET, a C# reflection package may be used to reflect classes from the .DLL file.

According to embodiments of the present invention, the test cases used to evaluate the interoperability of a web service under test includes empty or dummy variables. This enables the test case to abstract away from different data formats (e.g., date, floating point formats) that may have been specified by the WS-I standards, because the values (specific dates or floating point values, for example) form no part of the generated test cases. The test case generator 108, according to embodiments of the present invention, automatically generates an XML test case that includes such empty or dummy variables. This XML test case may then be passed to the test case handler 116. To actually run the test case against the various web services tools (e.g., AXIS, BPEL and .NET) as called for by reference number 118, the user may then input values for some or all of the empty or dummy variables of one or more operations defined in the WSDL and invoke the targeted web services from a selected client platform as shown at 120. The populated test cases may then be run one by one by each of the web services tools selected by the user to run the test case, as shown at 118. In the case of the AXIS web services tool, after locating the appropriate reflected method to call, the input parameters (including the input values for the dummy variables), may be dynamically reflected and the tool run. In the case of the BPEL web services tool, Remote Method Invocation (RMI) calls may be made to invoke the asynchronous BPEL process. Appropriate normalized messages may then be created from the input parameters and fed as input to the BPEL tool. Lastly, in the case of the .NET web services tool, after locating the appropriate reflected method to call, the input parameters (including the input values for the dummy variables), may be dynamically reflected and the tool run. To input the data into the dummy variables into the XML test case to enable testing thereof against selected web services tools may require the data to be populated therein by calling specific APIs. For example, to test a proposed web service against the .NET and AXIS web services tools, may require writing two different data loading/object creation programs.

A renderer module 126 may then be used to provide the user with the results of running the test cases against the selected web services tool or tools. This module may be configured to both display the results of the test or test and to write the results in one or more files, as called for by reference numeral 128. According to an embodiment of the present invention, the result of running the test case(s) against the web service tool(s) may be XML-formatted. The XML-formatted results may be rendered and displayed as an HTML file using a stylesheet, for example.

FIG. 2 shows further aspects of the present methods and systems for testing the interoperability of web services, according to embodiments of the present invention. As shown in the exemplary user interface of FIG. 2, the user may be prompted to enter a file URL or HTTP URL of a WSDL file describing the web service to be tested into the textbox 202 and to click on the ADD WSDL button 204 or functional equivalent to register the WSDL into the testing framework according to embodiments of the present invention. Once a WSDL file is registered, any number of test cases may be created for the registered WSDL file. A link to web services security settings may be provided, as shown at 206. Web services security may, but need not be used. FIG. 3 shows still further aspects of the present methods and systems for testing the interoperability of web services, according to embodiments of the present invention. As shown in this exemplary user interface, the URL of the WSDL file that describes the web service to be tested is shown at 302. The currently registered WSDL file may be removed by clicking the "remove WSDL" button 312. Once a WSDL file has been registered, it may be run against a selected one, ones or all of the client web services testing tools (in this case, AXIS, BPEL and .NET). Check boxes, for example, may be used to enable the user to select against which web services tool the WSDL file is to be compiled and tested, as shown at 304, 306 and 308. For efficiency, the user may be provided with the opportunity to re-use a previously generated and compiled test case for the WSDL file that described the web service to be tested, instead of generating it for every test run against the WSDL, by de-checking the checkboxes.

Figure 4:
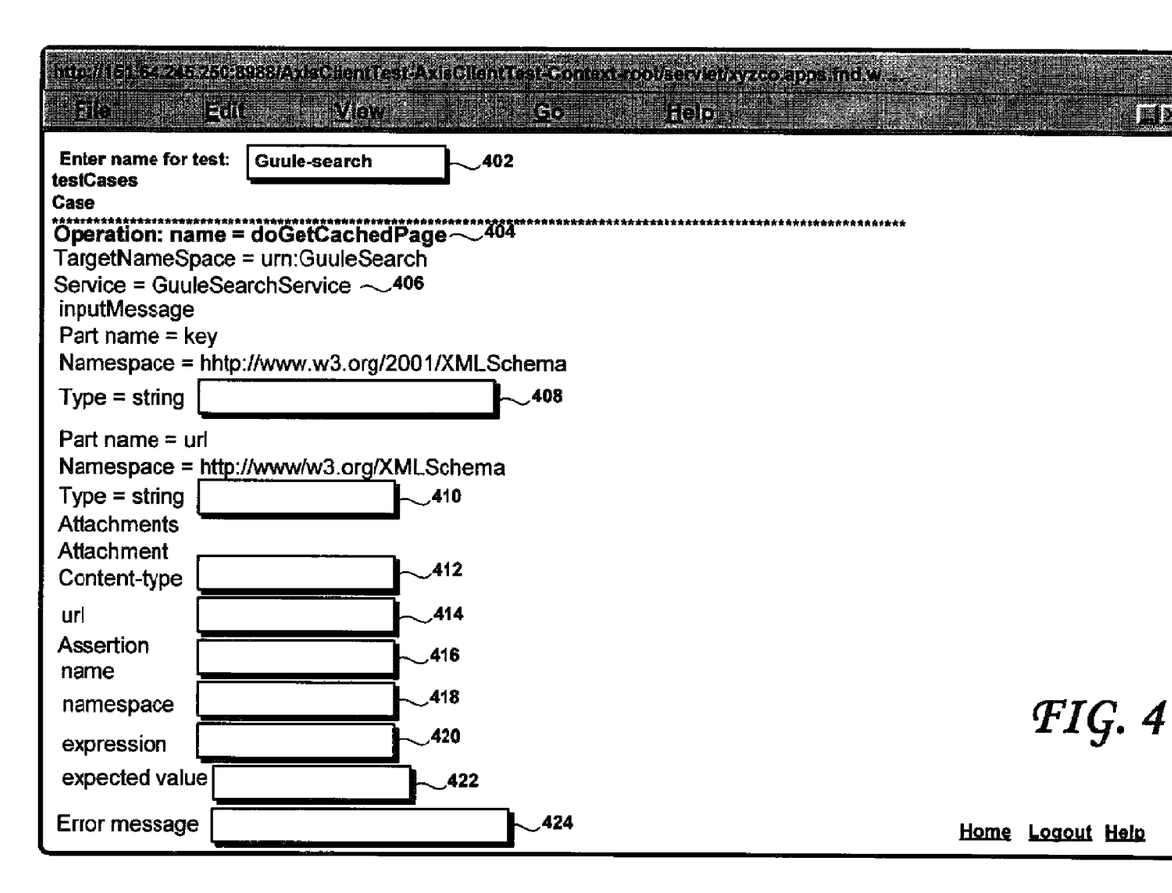
FIG. 4 shows still further aspects of the present methods and systems for testing the interoperability of web services, according to embodiments of the present invention.

New test case(s) may be generated by clicking on the 'Generate new TestCase' button 310. According to an embodiment of the present invention, generating a new test case may result in a HTML form being displayed where text boxes may be displayed for each operation in the WSDL file describing the web service under test. The text boxes allow the user to enter input data for any or all of the constituent operations of the web service under test and store them under a test group name, as shown at FIG. 4. This enables values to be input into the dummy variables generated in the test case generator 108 of FIG. 1 and the test cases to be generated using the inputted values. As shown in FIG. 4, the user may be prompted to enter a name for the test. In this example, the case is called Guule-search, as shown at 402. As shown in FIG. 4, a plurality of text boxes may be provided and defined for each operation in the web service under test. The text boxes may be configured as to the acceptable data type (e.g., string, Boolean, integer, text/XML, etc.) for the value to be entered by the user. Text boxes may be defined and provided for all of the dummy or empty variables created in the test case generator 108, to enable the user to input values and/or expected output values for each operation in the web service under test. In the example of FIG. 4, the operation name for which the text boxes are created is called "doGetCachedPage" as shown at 404, which is an operation in the GuuleSearchService web service under test, as shown at 406. For example, text boxes may be configured for a key 408, URL 410, attachment content type 412, URL 414, assertion name 416, namespace 418, expression 420, expected value 422 and error message 424, for example. The text boxes provided will vary according to the specific operation and the specific web service under test, as may be appreciated. Advantageously, configuring the test cases with dummy variables and requiring the user to input values for such dummy variables before the test cases are run against the selected web services tools ensures that the generated test cases are generic to any given web service tool. Every web service stack (e.g., AXIS, .NET and BPEL) has its own set of serializers/deserializers to carry out translation functions to ensure, for example, that the proper formats are used for such things as dates, floating point operations, time and like variables. Embodiments of the present invention are configured to select the correct serializers for the selected web service tool.

Figure 5:
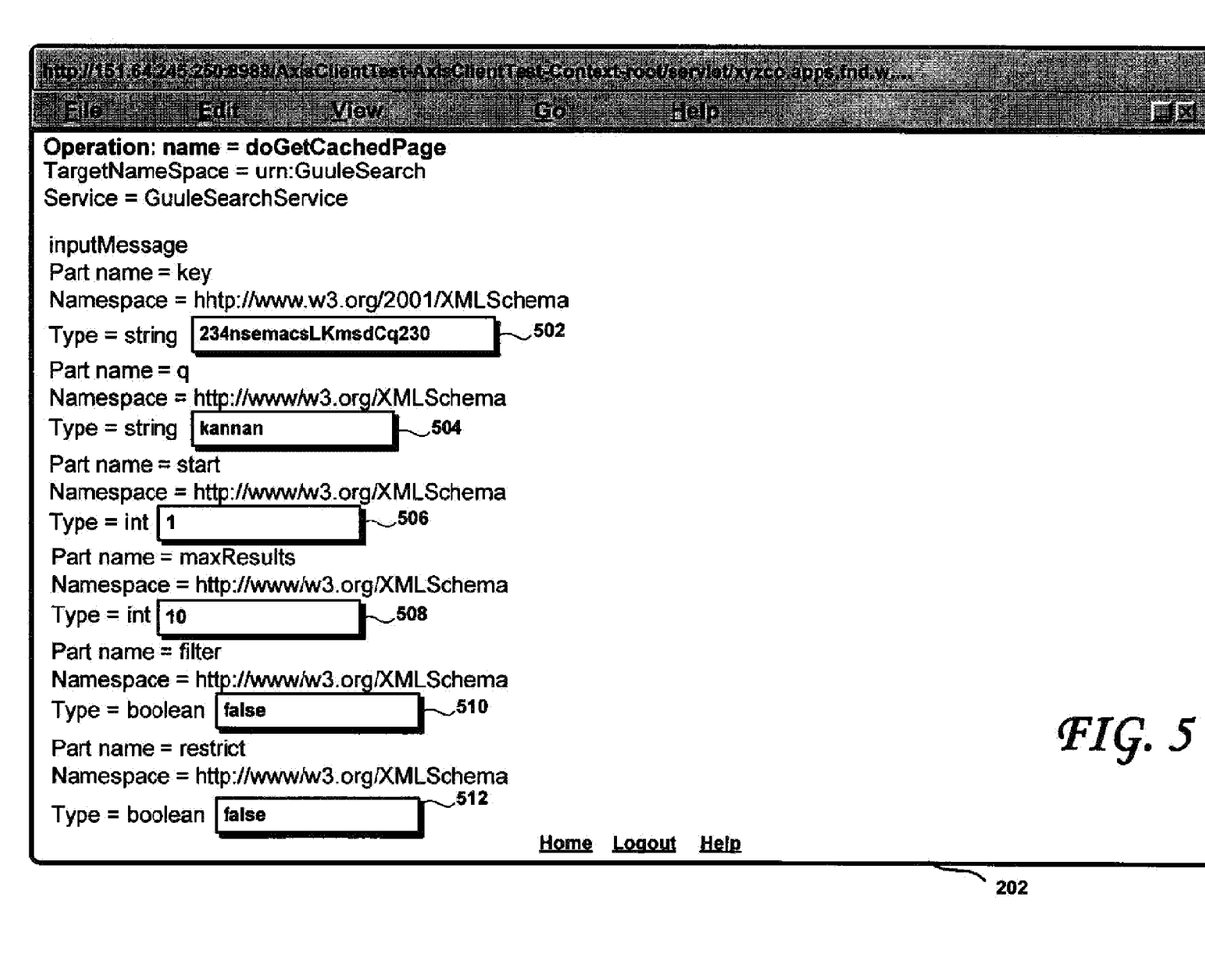
FIG. 5 shows further aspects of the present methods and systems for testing the interoperability of web services, according to embodiments of the present invention.
Figure 6:
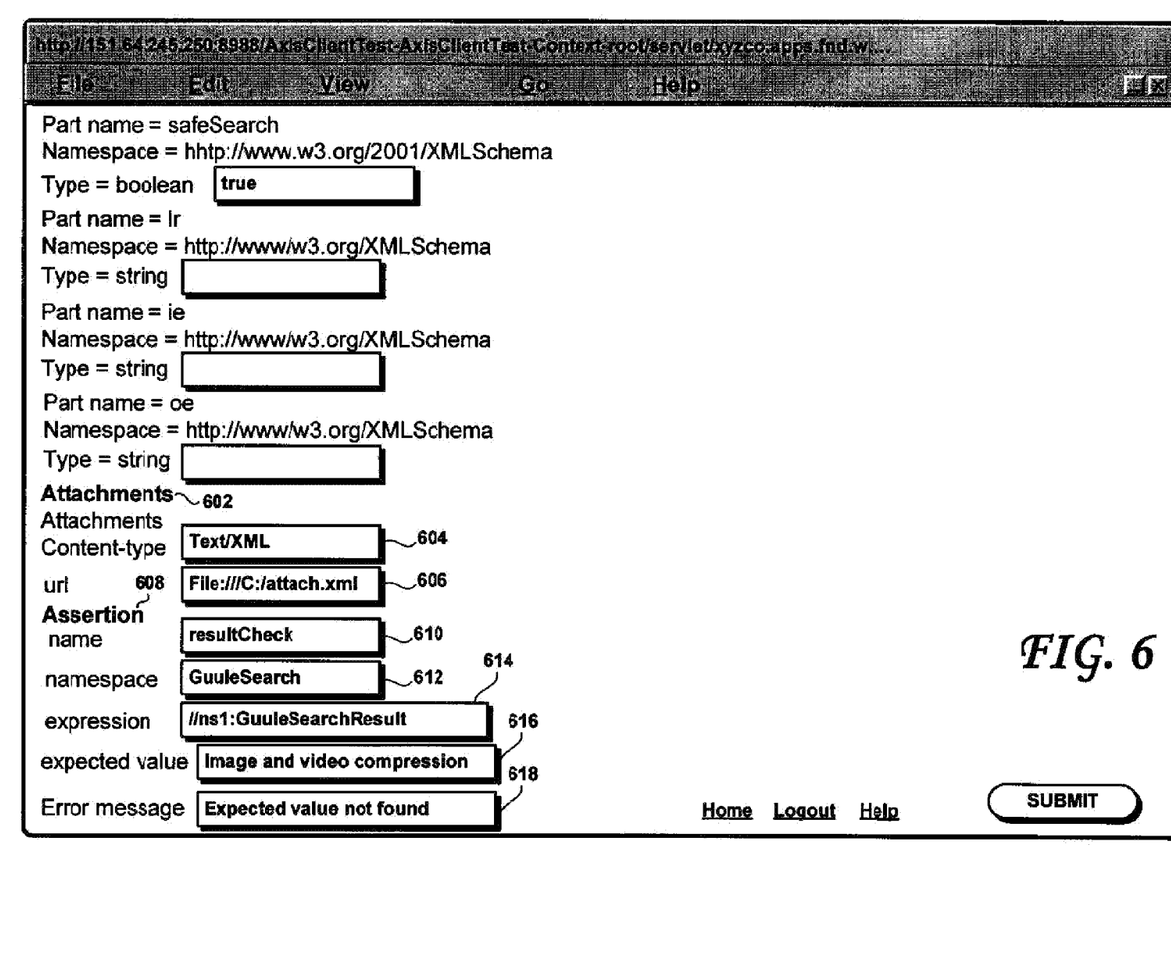
FIG. 6 shows yet further aspects of the present methods and systems for testing the interoperability of web services, according to embodiments of the present invention.

FIGS. 5 and 6 show exemplary user-input values for the dummy variables (called part names in FIGS. 4-6) of the exemplary operation DoGetCachedPage of the exemplary web service GuuleSearchService. As may be seen therein, values of any type may be specified, as called for by the operation for which the values are input. As shown in FIG. 5, the user may input values for string-type variables 502, 504, integer-type values 506, 508 or Boolean-type values, as shown at 510, 512. Other data types may be supported as well. As shown in FIG. 6, the present framework supports attachments 602. Attachments may be specified as Multipurpose Internet Mail Extension (Mime) data, along with user-specified operation data, which may include the type of the attachment 604 and the location of the attachment, as shown at 606. Embodiments of the present invention also support assertions associated with a test case, as shown at 608 in FIG. 6. What value is expected in the response to the assertion may be specified in the form of an Xpath query, which returns all nodes of the XML test case that matches the query. As shown in the exemplary case of FIG. 6, the user has entered the name 610 of the assertion, an expression 614 to be searched in the response, an expected value 616 and an error message, as shown at 618. The user in this example, as shown at 608, has also specified the namespace prefix 612 used in the Xpath query. According to an embodiment of the present invention, only those operations of the web service under test that has at least some input data keyed in by the user may be stored as XML test case 114.

Figure 7:
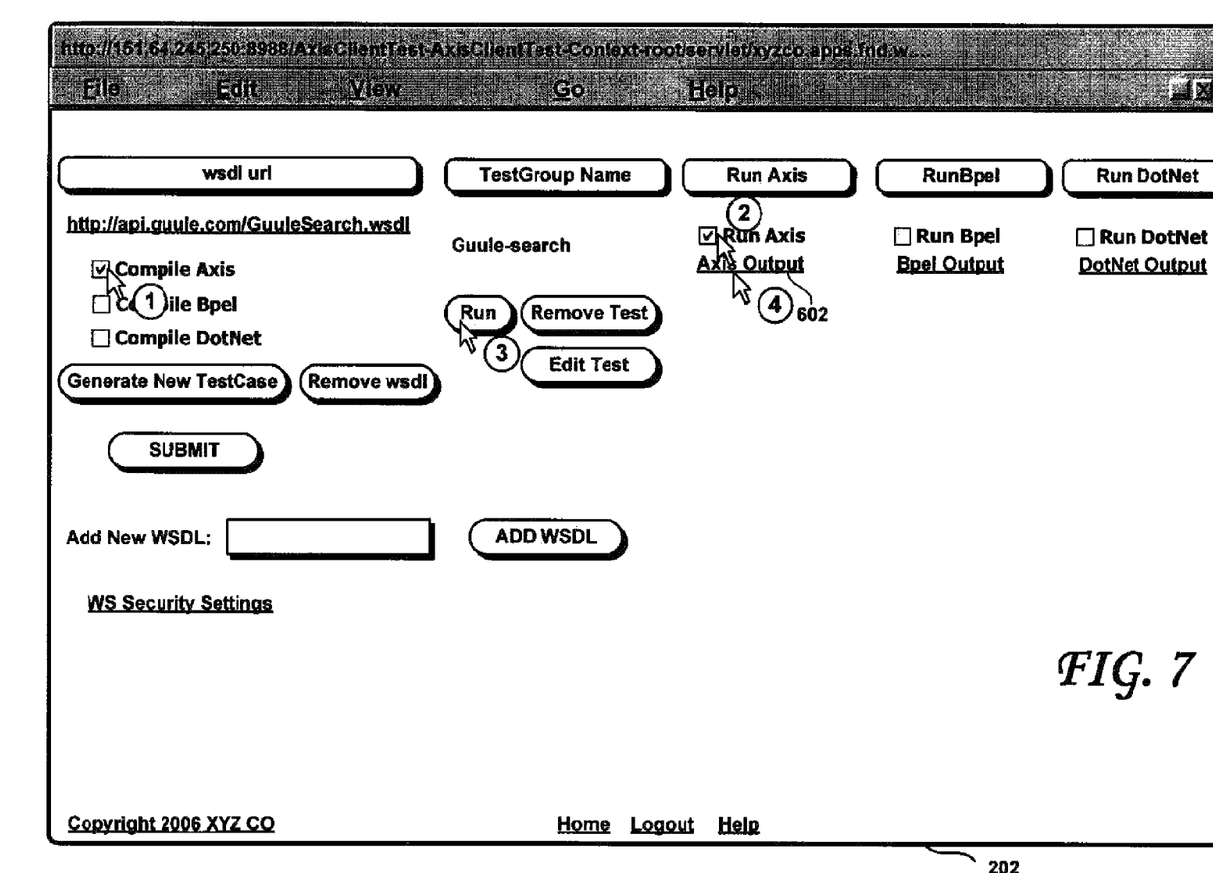
FIG. 7 shows further aspects of the present methods and systems for testing the interoperability of web services, according to embodiments of the present invention.

Once the desired input values have been entered by the user, the user may invoke the targeted web service using the generated test cases and the inputted data, as shown at 114 and 120 in FIG. 1. FIG. 7 shows further aspects of the present invention. As shown therein, the user has selected the "Compile Axis" checkbox as shown at (1), indicating that the test case and the inputted values are to be compiled using the Axis web services tools to create the necessary objects and has selected the "Run Axis" checkbox as shown at (2), thereby indicating that the compiled test case is to be run using the Axis web services tool. The user may then click "Run" as shown at (3), whereupon the compiled test case is to be run against the selected web services tool or tools (in this case, only the Axis web service tool). The output of the test may be stored in a file that may be viewed by the user by clicking or otherwise selecting the "Axis Output" link 602, as shown at (4). The generated test cases and inputted values may also be compiled and run against the other web services tools, one by one and the results of such tests may be stored in separate files.

Embodiments of the present invention reduce development cost of testing web services by generating test cases that may be input with desired data values, compiled and run against selected ones or all web service tools. After a given web service has been successfully tested against all available web service tools, it may be assumed with a great degree of confidence that the web service will operate as intended, irrespective of the web service stack (the standards and protocols used to consume a web service). As such, interoperability is tested as the web service is to be consumed, with the web service stack in question—and not tested on the basis of how well the web service under test implements standards promulgated by WS-I or other standard setting organizations.

Figure 8:
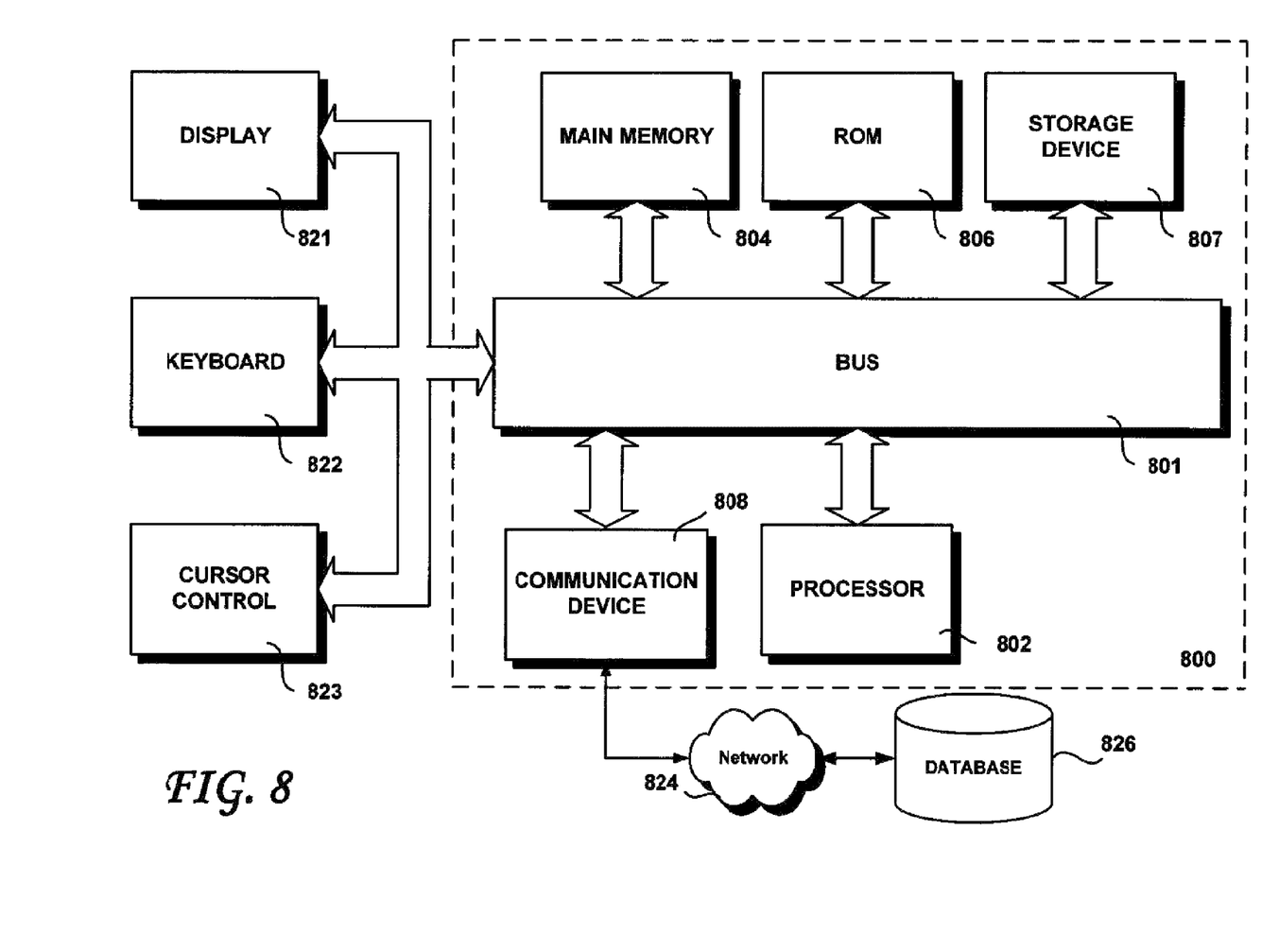
FIG. 8 is a block diagram of a computer with which embodiments of the present invention may be practiced.

FIG. 8 illustrates a block diagram of a computer system 800 upon which embodiments of the present inventions may be implemented. Computer system 800 includes a bus 801 or other communication mechanism for communicating information, and one or more processors 802 coupled with bus 801 for processing information. Computer system 800 further comprises a random access memory (RAM) or other dynamic storage device 804 (referred to as main memory), coupled to bus 801 for storing information and instructions to be executed by processor(s) 802. Main memory 804 also may be used for storing temporary variables or other intermediate information during execution of instructions by processor 802. Computer system 800 also includes a read only memory (ROM) and/or other static storage device 806 coupled to bus 801 for storing static information and instructions for processor 802. A data storage device 807, such as a magnetic disk or optical disk, may be coupled to bus 801 for storing information and instructions. The computer system 800 may also be coupled via the bus 801 to a display device 821 for displaying information to a computer user. An alphanumeric input device 822, including alphanumeric and other keys, may be coupled to bus 801 for communicating information and command selections to processor(s) 802. Another type of user input device is cursor control 823, such as a mouse, a trackball, or cursor direction keys for communicating direction information and command selections to processor 802 and for controlling cursor movement on display 821. The computer system 800 may be coupled, via a network 824, to a database 826 configured to store the output files of the web services tools and/or other information.

Embodiments of the present invention are related to the use of computer system and/or to a plurality of such computer systems to enable methods and systems for testing the interoperability of web services against a plurality of web service tools. According to one embodiment, the methods and systems described herein may be provided by one or more computer systems 800 in response to processor(s) 802 executing sequences of instructions contained in memory 804. Such instructions may be read into memory 804 from another computer-readable medium, such as data storage device 807. Execution of the sequences of instructions contained in memory 804 causes processor(s) 802 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of testing interoperability of web services against web services tools, the method comprising:

receiving, at one or more computer systems, information associated with a web services description language file (WSDL) that describes a targeted web service whose interoperability is to be tested against each of a plurality of web services tools;

receiving, at the one or more computer systems, information selecting each of the plurality of web services tools for testing against the targeted web service;

generating, with one or more processors associated with the one or more computer systems, sets of proxy files for each of the plurality of web services tools based on the WSDL file;

compiling, with the one or more processors associated with the one or more computer systems, the sets of proxy files generated for each of the plurality of web services tools and loading the compiled proxy files into memory of one or more test computer systems;

generating and storing, with the one or more processors associated with the one or more computer systems, an XML test case generic to the plurality of web services tools for each of the compiled sets of proxy files, each XML test case including dummy variables for each operation of the targeted web service specified in the WSDL file;

populating, with the one or more processors associated with the one or more computer systems, the generated XML test cases with values for at least some of the dummy variables; and invoking, with one or more processors associated with the one or more test computer systems, the targeted web service based on the populated XML test cases and the plurality of web services tools and providing results for each invocation.

2. The computer-implemented method of claim 1, wherein receiving, at the one or more computer systems, the information selecting each of the plurality of web services tools for testing against the targeted web service comprises receiving information selecting AXIS, .NET and BPEL.

3. The computer-implemented method of claim 1, wherein receiving, at the one or more computer systems, the information associated with the WSDL file comprises receiving a location of the WSDL file.

4. The computer-implemented method of claim 3, wherein the location includes a URL of the WSDL file.

5. The computer-implemented method of claim 2, wherein the compiling step is carried out in a manner specific to at least one of AXIS, .NET and BPEL.

6. The computer-implemented method of claim 2, wherein the compiling step is carried out with the sets of proxy files including Java proxy files and class files when a selected web services tool is AXIS, with the sets of proxy files including stubs in C# and DLL files when a selected web services tool is .NET, and with the sets of proxy files including BPEL XML files and reference WSDL files when a selected web services tool is BPEL.

7. The computer-implemented method of claim 1, further comprising, forwarding to a client computer system, information for displaying a user-interface configured to allow a user of the client computer to input values for each of the dummy variables for each operation of the generated XML test cases.

8. The computer-implemented method of claim 1, wherein providing the results for each invocation comprises providing the results in XML format.

9. The computer-implemented method of claim 8, further comprising generating, using a processor of a computer system, information for displaying the XML-formatted results as an HTML file using a stylesheet.

10. The computer-implemented method of claim 1, wherein generating, with the one or more processors associated with the one or more computer systems, the XML test case generic to the plurality of web services tools for each of the compiled sets of proxy files comprises generating at least one XML test case including an assertion and wherein the assertion includes dummy variables enabling at least one of a name of the assertion, all expression to be evaluated in the response to the assertion, an expected value of the assertion and an error message of the assertion to be provided.

11. The computer-implemented method of claim 1, wherein generating, with the one or more processors associated with the one or more computer systems, the XML test case generic to the plurality of web services tools for each of the compiled sets of proxy files comprises generating at least one XML test case including an attachment and wherein the attachment is specified as Multipurpose Internet Mail Extension (Mime) data and includes dummy variables enabling a type of the attachment and a location of the attachment to be provided.

12. The computer-implemented method of claim 1, further comprising forwarding, to a client computer, an HTML front end to enable user input in at least some of the receiving, generating, populating and invoking steps.

13. A non-transitory machine-readable medium having data stored thereon representing sequences of instructions which, when executed by a computing device, causes the computing device to test interoperability of web services against web services tools, the machine-readable storage medium comprising:

instructions for receiving information associated with a web services description language file (WSDL) that describes a targeted web service whose interoperability is to be tested against each of a plurality of web services tools;

instructions for receiving information selecting each of the plurality of web services tools for testing against the targeted web service;

instructions for generating sets of proxy files for each of the plurality of web services tools based on the WSDL file;

instructions for compiling the sets of proxy files generated for each selected web services tools;

instructions for generating and storing an XML test case generic to the plurality of web services tools for each of the compiled sets of proxy files, each XML test case including dummy variables for each operation of the targeted web service specified in the WSDL file;

instructions for populating the generated XML test cases with values for at least some of the dummy variables;

instructions for invoking the targeted web service based on the populated XML test cases and the plurality of web services tools; and instructions for providing results for each invocation.

14. The non-transitory machine-readable medium of claim 13, wherein the plurality of web services tools include at least one of AXIS, .NET and BPEL.

15. The non-transitory machine-readable medium of claim 13, wherein the instructions for receiving information associated with the WSDL file comprise receiving information associated with a location of the WSDL file.

16. The non-transitory machine-readable medium of claim 15, wherein the location includes a URL of the WSDL file.

17. The non-transitory machine-readable medium of claim 14, wherein the instructions for compiling include instructions for compiling in manner specific to the at least one of AXIS, .NET and BPEL.

18. The non-transitory machine-readable medium of claim 14, wherein the instructions for compiling include instructions for compiling the sets of proxy files including Java proxy files and class files when a selected web services tool is AXIS, the sets of proxy files including stubs in C# and .DLL files when a selected web services tool is .NET, and the sets of proxy files including BPEL XML files and reference WSDL files when a selected web services tool is BPEL.

19. The non-transitory machine-readable medium of claim 13, wherein the instructions for populating include instructions for receiving user input via a user-interface configured to allow a user to input values for each of the dummy variables for each operation of the generated XML test cases.

20. The non-transitory machine-readable medium of claim 13, wherein the instructions for providing the results comprise instructions for providing the results in XML format.

21. The non-transitory machine-readable medium of claim 20, further comprising instructions for generating information for displaying the XML-formatted results as an HTML file using a stylesheet.

22. The non-transitory machine-readable medium of claim 13, wherein the instructions for generating an XML test case generic to the plurality of web services tools for each of the compiled sets of proxy files comprises instructions for generating at least one XML test case including an assertion and wherein the assertion includes dummy variables enabling at least one of a name of the assertion, an expression to be searched in the response to the assertion, an expected value of the assertion and an error message of the assertion to be provided.

23. The non-transitory machine-readable medium of claim 13, wherein the instructions for generating an XML test case generic to the plurality of web services tools for each of the compiled sets of proxy files comprises instructions for generating at least one XML test case including an attachment and wherein the attachment is specified as Multipurpose Internet Mail Extension (Mime) data and includes dummy variables enabling a type of the attachment and a location of the attachment to be provided.

24. The non-transitory machine-readable medium of claim 13, further comprising instructions for providing an HTML front end to enable user input operated on by at least some of the instructions for receiving, generating, populating and invoking.

25. A computer system for test interoperability of web services against web services tools, the computer system comprising:
 at least one processor; and
 at least one data storage device coupled to the at least one processor and storing a set of instructions for spawning a plurality of processes that include processing logic for:
  receiving information associated with a web services description language file (WSDL) that describes a targeted web service whose interoperability is to be tested against a plurality of web services tools;
  receiving information selecting each of the plurality of web services tools for testing against the targeted web service;
  generating sets of proxy files for each of the plurality of web service tools based on the WSDL file;
  compiling the sets of proxy files generated for each of the plurality of web services tools;
  generating and storing an XML test case generic to the plurality of web services tools for each of the compiled sets of proxy files, each XML test case including dummy variables for each operation of the targeted web service specified in the WSDL file;
  populating the generated XML test cases with values for at least some of the dummy variables;
  invoking the targeted web service based on the populated XML test cases and the plurality of web services tools; and
  providing results for each invocation.

26. The computer system of claim 25, wherein the selecting step is carried out with the plurality of web services tools include at least one of AXIS, .NET and BPEL.

27. The computer system of claim 25, wherein the processing logic for receiving information associated with the WSDL file includes processing logic for receiving a location of the WSDL file.

28. The computer system of claim 27, wherein the location includes a URL of the WSDL file.

29. The computer system of claim 28, wherein the processing logic for compiling comprising compiling in a manner specific to at least one of AXIS, .NET and BPEL.

30. The computer system of claim 26, wherein the processing logic for compiling the sets of proxy files including Java proxy files and class files when a selected web services tool is AXIS, the sets of proxy files stubs in C# and .DLL files when a selected web services tool is .NET, and the sets of proxy files BPEL XML files and reference WSDL files when a selected web services tool is BPEL.

31. The computer system of claim 25, wherein the processing logic for populating comprises receiving user input via a user-interface configured to allow a user to input values for each of the dummy variables for each operation of the generated XML test cases.

32. The computer system of claim 25, wherein the processing logic for providing the results comprises providing the results in XML format.

33. The computer system of claim 32, further comprising processing logic for displaying the results as an HTML file using a stylesheet.

34. The computer system of claim 25, wherein the processing logic for generating an XML test case generic to the plurality of web services tools for each of the compiled sets of proxy files comprises generating at least one XML test case including an assertion and wherein the assertion includes dummy variables enabling at least one of a name of the assertion, an expression to be searched in the response to the assertion, an expected value of the assertion and an error message of the assertion to be provided.

35. The computer system of claim 25, wherein the processing logic for generating an XML test case generic to the plurality of web services tools for each of the compiled sets of proxy files comprises generating at least one XML test case including an attachment and wherein the attachment is specified as Multipurpose Internet Mail Extension (Mime) data and includes dummy variables enabling a type of the attachment and a location of the attachment to be provided.

36. The computer system of claim 25, further comprising processing logic for providing an HTML front end to enable user input in at least some of the processing logic for receiving, generating, populating and invoking.

* * * * *